US007768450B2

(12) United States Patent
Nichols

(10) Patent No.: US 7,768,450 B2
(45) Date of Patent: Aug. 3, 2010

(54) POSITION DETERMINATION SYSTEM USING RADIO AND LASER IN COMBINATION

(75) Inventor: Mark E. Nichols, Christchurch (NZ)

(73) Assignee: Trimble Navigation Ltd., Sunnyvale, CA (US)

( * ) Notice: Subject to any disclaimer, the term of this patent is extended or adjusted under 35 U.S.C. 154(b) by 672 days.

(21) Appl. No.: 11/784,087

(22) Filed: Apr. 4, 2007

(65) Prior Publication Data
US 2008/0247758 A1 Oct. 9, 2008

(51) Int. Cl.
*G01S 1/02* (2010.01)
*G01S 5/02* (2010.01)
(52) U.S. Cl. .................. 342/357.08; 342/357.06; 701/213
(58) Field of Classification Search ............ 342/357.01, 342/357.02, 357.06, 357.08; 701/213, 215
See application file for complete search history.

(56) References Cited

U.S. PATENT DOCUMENTS

| 5,100,229 A | | 3/1992 | Lundberg et al. | |
| 5,706,250 A | * | 1/1998 | Rialan et al. | 367/77 |
| 5,969,676 A | | 10/1999 | Tran et al. | |
| 6,314,286 B1 | * | 11/2001 | Zicker | 455/431 |
| 6,433,866 B1 | | 8/2002 | Nichols | |
| 7,310,138 B2 | * | 12/2007 | Nichols et al. | 356/139.01 |
| 2001/0021639 A1 | * | 9/2001 | Kaku | 455/41 |
| 2007/0035440 A1 | | 2/2007 | Nichols | |
| 2007/0058161 A1 | | 3/2007 | Nichols et al. | |
| 2007/0159386 A1 | * | 7/2007 | Nichols | 342/357.08 |

* cited by examiner

*Primary Examiner*—Dao L Phan
(74) *Attorney, Agent, or Firm*—Boris G. Tankhilevich

(57) ABSTRACT

A combined radio and laser positioning system comprising: a network of ground based radio communication devices, a laser transmitter configured to generate at least one laser beam, and at least one user unit. Each user unit comprises a radio receiver configured to receive at least one ranging radio signal transmitted by at least one ground based radio communication device, a laser detector configured to receive at least one laser beam generated by the laser transmitter, and a processor configured to convert a set of data including: {a set of data transmitted by at least one ranging radio signal, and a set of data transmitted by said at least one laser beam} into position coordinates of the user unit, wherein a set of vertical coordinates of the user unit is obtained with a laser-assisted (LA) accuracy.

35 Claims, 2 Drawing Sheets

POSITION DETERMINATION SYSTEM USING RADIO AND LASER IN COMBINATION

BACKGROUND OF THE INVENTION

1. Field of the Invention

The current invention relates to position tracking and machine control systems, and, more specifically, to a combination of laser systems and ground based radio positioning systems.

2. Discussion of the Prior Art

The prior art ground based positioning system can provide a plurality of mobile units with positioning data. However, the prior art ground based positioning system have inherently poor vertical geometry.

SUMMARY OF THE INVENTION

The present invention addresses this problem by augmenting the ground based radio positioning system with a laser transmitter to improve the vertical positioning capability of such system up to millimeter accuracy.

More specifically, one aspect of the present invention is directed to a combined radio and laser positioning system.

In one embodiment, the positioning system of the present invention comprises: a network of ground based radio communication devices, a laser transmitter configured to generate at least one laser beam, and at least one user unit.

In this embodiment of the present invention, each user unit further comprises: a radio receiver configured to receive at least one ranging radio signal transmitted by at least one ground based radio communication device, a laser detector configured to receive at least one laser beam generated by the laser transmitter, and a processor configured to convert a set of data including: {a set of data transmitted by at least one ranging radio signal, and a set of data transmitted by at least one laser beam} into position coordinates of the user unit, wherein a set of vertical coordinates of the user unit is obtained with a laser-assisted (LA) accuracy.

In one embodiment of the present invention, at least one ground based radio communication device further comprises a ground based radio transceiver placed in a location with known coordinates.

In one embodiment of the present invention, at least one ground based radio communication device further comprises: a stationary radio positioning system (RADPS) receiver integrated with a ground based radio transmitter, wherein position coordinates of the ground based radio transmitter are determined by using a plurality of radio signals transmitted by at least one radio source selected from the group consisting of: {GPS; GLONASS; combined GPS/GLONASS; GALILEO; Global Navigational Satellite System (GNSS); pseudolite transmitter; pseudolite transceiver; TV transmitter; UWB transmitter; Bluetooth transmitter; Wi-Fi transmitter; terrestrially based positioning technologies using mobile phone signals (E-OTD or TDOA); Locata transmitter; and Locata transceiver}.

In one embodiment of the present invention, the network of ground based radio communication devices further comprises at least four synchronized ground based radio transceivers. In this embodiment of the present invention, the network of at least four synchronized ground based radio transceivers provides 3-D solution for position coordinates of each mobile unit.

In one embodiment of the present invention, the network of ground based radio communication devices further comprises at least four synchronized ground based radio transceivers having a substantially weak vertical geometry. In this embodiment of the present invention, the network of at least four synchronized ground based radio transceivers provides 3-D solution for position coordinates of each mobile unit, wherein the 3-D solution has a substantially low vertical accuracy.

In one embodiment of the present invention, the network of ground based radio communication devices further comprises at least three synchronized ground based radio transceivers. In this embodiment of the present invention, the network of at least three synchronized ground based radio transceivers provides 2-D solution for horizontal position coordinates of each mobile unit.

In one embodiment of the present invention, the network of ground based radio communication devices further comprises at least three ground based radio transceivers with an external synchronization signal. In this embodiment of the present invention, the network of at least three ground based radio receivers provides 3-D solution for position coordinates of each mobile unit.

In one embodiment of the present invention, the network of ground based radio communication devices further comprises at least two ground based radio transceivers with an external synchronization signal. In this embodiment of the present invention, the network of at least two ground based radio receivers provides 2-D solution for horizontal position coordinates of each mobile unit.

In one embodiment of the present invention, the network of ground based radio communication devices further comprises a single ground based radio transceiver with an external synchronization signal. In this embodiment of the present invention, the single ground based radio transceiver provides a single distance coordinate from the single ground based radio transceiver to each mobile unit.

In one embodiment of the present invention, the laser transmitter further comprises a laser transmitter placed in a location with known coordinates.

In one embodiment of the present invention, the laser transmitter further comprises a laser transmitter placed in a location with unknown coordinates.

In one embodiment of the present invention, the laser transmitter further comprises a self-surveying laser transmitter further comprising a stationary radio positioning system (RADPS) receiver integrated with the self-surveying laser transmitter. In this embodiment of the present invention, the stationary RADPS receiver includes a stationary radio antenna. In this embodiment of the present invention, the position coordinates of the laser transmitter are determined by using the stationary RADPS receiver that receives a plurality of radio signals from at least one radio source selected from the group consisting of: {GPS; GLONASS; combined GPS/GLONASS; GALILEO; Global Navigational Satellite System (GNSS); pseudolite transmitter; TV transmitter; UWB transmitter; Bluetooth transmitter; Wi-Fi transmitter; terrestrially based positioning technologies using mobile phone signals (E-OTD or TDOA); and Locata transmitter}.

In one embodiment of the present invention, the laser transmitter further comprises a planar laser configured to generate a reference laser beam providing a vertical coordinate having a substantially high accuracy.

In one embodiment of the present invention, the laser transmitter further comprises a sloping planar laser configured to generate a reference sloping laser beam providing two angular coordinates having a substantially high accuracy.

In one embodiment of the present invention, the laser transmitter further comprises a fan laser configured to generate at least one sloping fan laser beam.

In one embodiment of the present invention, the laser transmitter further comprises a fan laser configured to generate at least two sloping fan laser beams.

In one embodiment of the present invention, at least one user unit further comprises a wireless communication device configured to transmit the position coordinates of the user unit.

In one embodiment, the positioning system of the present invention further comprises a wireless communication link selected from the group consisting of: {a cellular link; a radio link; a private radio band link; a Site Net 900 private radio network; a wireless Internet link; a UWB link; a Bluetooth link; a Wi-Fi link; and a satellite wireless communication link}.

In one embodiment of the present invention, at least one user unit further comprises a mobile unit further comprising an on-board computer configured to utilize the set of positioning data that is obtained with the laser assisted (LA) vertical accuracy.

In one embodiment of the present invention, at least one mobile unit further comprises an implement. In this embodiment of the present invention, the implement is controlled by utilizing a set of positioning data that is obtained with the laser assisted (LA) vertical accuracy.

In one embodiment, the system of the present invention further comprises a Remotely Located Tracking Station (RLTS) configured to utilize the set of positioning data of a mobile unit obtained with the laser assisted (LA) vertical accuracy in order to track the mobile unit.

Another aspect of the present invention is directed a user unit positioning system.

In one embodiment, the user unit positioning system of the present invention comprises: a radio receiver further comprising a radio antenna configured to receive a plurality of ranging radio signals including at least one ranging signal transmitted by at least one ground based radio communication device, and a satellite antenna configured to receive at least one ranging satellite radio signal transmitted by at least one GNSS satellite; a laser detector configured to receive at least one laser beam generated by a laser transmitter; and a processor configured to convert a set of data including: {a set of data transmitted by at least one ranging radio signal; a set of data transmitted by at least one ranging satellite radio signal; and a set of data transmitted by at least one laser beam} into position coordinates of the user unit, wherein a set of vertical coordinates of the user unit is obtained with a laser-assisted (LA) accuracy. In this embodiment of the present invention, each ground based radio communication device is selected from the group consisting of: {a pseudolite transmitter; a pseudolite transceiver; a TV transmitter; an UWB transmitter; a Bluetooth transmitter; a Wi-Fi transmitter; terrestrially based positioning technologies using mobile phone signals (E-OTD or TDOA); a Locata transmitter; and a Locata transceiver}. In this embodiment of the present invention, each GNSS satellite is selected from the group consisting of: {a GPS satellite; a GLONASS satellite; and a GALILEO satellite}. In this embodiment of the present invention, the laser transmitter is selected from the group consisting of: {a planar laser transmitter; a sloping planar laser transmitter; and a fan laser transmitter}.

One more aspect of the present invention is directed a method of combined radio and laser positioning.

In one embodiment, the method of combined radio and laser positioning comprises: (A) providing a network of ground based radio communication devices; (B) providing a laser transmitter configured to generate at least one laser beam; and (C) using the network of ground based radio communication devices and using the laser transmitter to obtain position coordinates of at least one user unit with a laser-assisted (LA) accuracy.

In one embodiment of the present invention, the step (A) further comprises: (A1) selecting at least one ground based radio communication device from the group consisting of: {a pseudolite transmitter; a pseudolite transceiver; a TV transmitter; an UWB transmitter; a Bluetooth transmitter; a Wi-Fi transmitter; terrestrially based positioning technologies using mobile phone signals (E-OTD or TDOA); a Locata transmitter; and a Locata transceiver}.

In one embodiment of the present invention, the step (B) further comprises: (B1) selecting the laser transmitter from the group consisting of: {a planar laser transmitter; a sloping planar laser transmitter; and a fan laser transmitter}.

In one embodiment of the present invention, wherein at least one user unit further comprises a radio receiver, a laser detector, and a processor, the step (C) further comprises: (C1) using the radio receiver to receive at least one ranging radio signal transmitted by at least one ground based radio communication device; (C2) using the laser detector to receive at least one laser beam generated by the laser transmitter; and (C3) using the processor to convert a set of data including {a set of data transmitted by at least one ranging radio signal; and a set of data transmitted by at least one laser beam} into position coordinates of the user unit, wherein a set of vertical coordinates of the user unit is obtained with a laser-assisted (LA) accuracy.

In one embodiment, wherein at least one user unit further comprises a wireless communication device, the method of the present invention further comprises: (C4) using the wireless communication device to transmit the position coordinates of the user unit by using a wireless communication link; wherein the wireless communication link is selected from the group consisting of: {a cellular link; a radio link; a private radio band link; a Site Net 900 private radio network; a wireless Internet link; a UWB link; a Bluetooth link; a Wi-Fi link; and a satellite wireless communication link}.

In one embodiment, wherein at least one user unit further comprises a mobile unit further comprising an on-board computer, the method of the present invention further comprises: using the on-board computer to control the user unit by utilizing the set of positioning data obtained with the laser assisted (LA) vertical accuracy. In another embodiment, wherein at least one user unit further comprises a mobile unit further comprising an on-board computer, the method of the present invention further comprises: manually controlling the mobile unit by using the set of positioning data of the mobile unit provided by the on-board computer, wherein the set of positioning data of the mobile unit is obtained with the laser assisted (LA) vertical accuracy.

In one embodiment, wherein at least one user unit further comprises an implement, the method of the present invention further comprises: using the on-board computer to control the implement by utilizing a set of positioning data of the implement, wherein the set of positioning data of the implement is obtained with the laser assisted (LA) vertical accuracy. In another embodiment, wherein at least one user unit further comprises an implement, the method of the present invention further comprises: manually controlling the implement by using the set of positioning data of the implement provided by the on-board computer; wherein the set of positioning data of the implement is obtained with the laser assisted (LA) vertical accuracy.

Yet, one more aspect of the present invention is directed to a method of user unit positioning. In one embodiment, the method of user unit positioning of the present invention further comprises: (A) using a radio receiver to receive at least one ranging radio signal transmitted by at least one ground based radio communication device; (B) using the radio receiver to receive at least one ranging satellite radio signal transmitted by at least one GNSS satellite; (C) using a laser detector to receive at least one laser beam generated by a laser transmitter; and (D) using a processor to convert a set of data including: {a set of data transmitted by at least one ranging radio signal; a set of data transmitted by at least one ranging satellite radio signal; and a set of data transmitted by at least one laser beam} into position coordinates of the user unit, wherein a set of vertical coordinates of the user unit is obtained with a laser-assisted (LA) accuracy.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
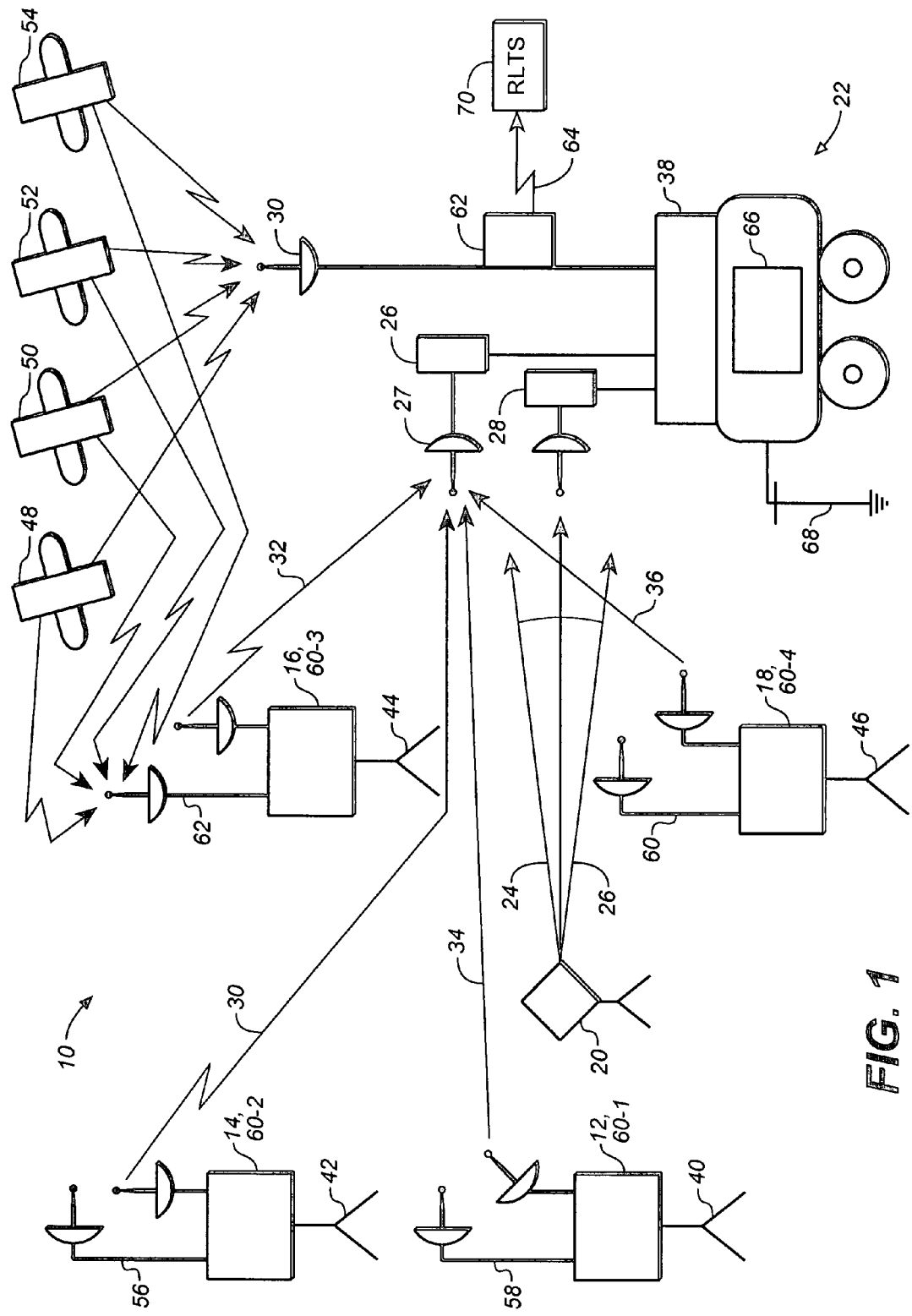
FIG. 1 depicts the positioning system of the present invention comprising a network of ground based radio communication devices, a laser transmitter configured to generate at least one laser beam, and at least one user unit.

In one embodiment, FIG. 1 depicts the positioning system 10 of the present invention comprising a network of ground based radio communication devices 12, 14, 16 and 18, a laser transmitter 20 configured to generate at least one laser beam (24, 26), and at least one user unit 22.

In one embodiment of the present invention, at least one ground based radio communication device (12, 14, 16, and/or 18 of FIG. 1) further comprises a ground based radio transceiver placed in a location with known coordinates.

EXAMPLE I

The ground based radio communication device 12 further comprises a ground based radio transceiver placed in a location 40 with known coordinates, the ground based radio communication device 14 further comprises a ground based radio transceiver placed in a location 42 with known coordinates, the ground based radio communication device 16 further comprises a ground based radio transceiver placed in a location 44 with known coordinates, and the ground based radio communication device 18 further comprises a ground based radio transceiver placed in a location 46 with known coordinates.

In one embodiment of the present invention, at least one ground based radio communication device (12, 14, 16, and/or 18) further comprises a stationary radio positioning system (RADPS) receiver (58, 56, 62, and 60 respectively) integrated with a ground based radio transmitter, wherein position coordinates of a ground based radio transmitter are determined by using a plurality of radio signals transmitted by at least one radio source (48, 50, 52, and/or 54) selected from the group consisting of: {GPS; GLONASS; combined GPS/GLONASS; GALILEO; Global Navigational Satellite System (GNSS); pseudolite transmitter; pseudolite transceiver; TV transmitter; UWB transmitter; Bluetooth transmitter; Wi-Fi transmitter; terrestrially based positioning technologies using mobile phone signals (E-OTD or TDOA); Locata transmitter; and Locata transceiver}.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency $f1=1575.42$ MHz (approximately nineteen centimeter carrier wavelength) and an L2 signal having a frequency $f2=1227.6$ MHz (approximately twenty-four centimeter carrier wavelength). These two frequencies are integral multiplies $f1=1,540$ $f0$ and $f2=1,200$ $f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k=(1,2, . . . 24) is the channel or satellite number. These frequencies lay in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

As disclosed in the European Commission "White Paper on European transport policy for 2010", the European Union will develop an independent satellite navigation system Galileo as a part of a global navigation satellite infrastructure (GNSS).

The GALILEO system is based on a constellation of 30 satellites and ground stations providing information concerning the positioning of users in many sectors such as transport (vehicle location, route searching, speed control, guidance systems, etc.), social services (e.g. aid for the disabled or elderly), the justice system and customs services (location of suspects, border controls), public works (geographical information systems), search and rescue systems, or leisure (direction-finding at sea or in the mountains, etc.).

GALILEO will offer several service levels, from open access to restricted access of various levels:

(A) An open, free basic service, mainly involving applications for the general public and services of general interest. This service is comparable to that provided by civil GPS, which is free of cost for these applications, but with improved quality and reliability.

(B) A commercial service facilitating the development of professional applications and offering enhanced performance compared with the basic service, particularly in terms of service guarantee.

(C) A "vital" service (Safety of Life Service) of a very high quality and integrity for safety-critical applications, such as aviation, shipping, and search and rescue service that will greatly improve existing relief and rescue services.

(D) A public regulated service (PRS), encrypted and resistant to jamming and interference, reserved principally for the public authorities responsible for civil protection, national security and law enforcement which demand a high level of continuity. It will enable secured applications to be developed in the European Union, and could prove in particular to be an important tool in improving the instruments used by the European Union to combat illegal exports and illegal immigration.

The real needs of future GALILEO users need to be identified before the characteristics of the package of services can be decided. Studies have already been carried out in various standardization institutes and international bodies, such as the International Civil Aviation Organization, the International Maritime Organization, etc.

The range of GALILEO services is designed to meet practical objectives and expectations, from improving the coverage of open-access services in urban environments (to cover 95% of urban districts compared with the 50% currently covered by GPS alone) which will benefit the 160 million private vehicles in Europe, or enabling the use of satellite navigation applications "indoors", in buildings and even in tunnels, or indeed mobile telephone services based on identifying the caller's position.

A pseudolite comprises a ground based radio positioning system working in any radio frequency including but not limited to the GPS frequencies and the ISM (industrial scientific medical) unlicensed operation band, including 900 MHz, 2.4 GHz, or 5.8 GHz bands ISM bands, or in a radio location band such as the (9.5-10) GHz band. Pseudolites can be used for enhancing the GPS by providing increased accuracy, integrity, and availability.

The complete description of the pseudolite transmitters in GPS band can be found in "Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautics and Astronautics, Inc., in 1966.

In ISM band, including 900 MHZ, 2.4 GHz, or 5.8 GHz bands, the user can own both ends of the ISM communication system. The ISM technologies are manufactured by Trimble Navigation Limited, Sunnyvale, Calif. Metricom, Los Gatos, Calif. and by Utilicom, Santa Barbara, Calif.

Pseudolites as radio positioning systems can be configured to operate in ISM band. In one embodiment of the present invention, at least one ground based radio communication devices can be implemented by using pseudolites.

GPS signals were designed for accurate tracking and location in open outdoor areas; however, indoors and in urban areas, the technology is not reliable. Assisted GPS (A-GPS) helps the GPS receiver by providing an alternate source of the fragile navigation message and helping the receiver average for extended periods of time. However, even A-GPS is unreliable indoors due to the fundamental physics of GPS satellite signals.

In contrast, television signals were designed for indoor reception. Rosum Inc., located in Mountain View, Calif., manufactures the RADPS that use TV-GPS uses commercial broadcast TV signals to provide reliable positioning indoors and in urban environments. By combining TV signals with GPS signals, Rosum can provide seamless indoor/outdoor coverage across all environments.

In one embodiment of the present invention, at least one ground based radio communication device (12, 14, 16, and/or 18 of FIG. 1) can be implemented by using TV-GPS technology.

In one embodiment of the present invention, at least one ground based radio communication device (12, 14, 16, and/or 18 of FIG. 1) can be implemented by using Ultra-Wideband (UWB) technology designed for transmitting information spread over a large bandwidth (>500 MHz). A Feb. 14, 2002

Report and Order by the FCC authorizes the unlicensed use of UWB in 3.1-10.6 GHz. This is intended to provide an efficient use of scarce radio bandwidth while enabling both high data rate personal-area network (PAN) wireless connectivity and longer-range, low data rate applications as well as radar and imaging systems. More than four dozen devices have been certified under the FCC UWB rules, the vast majority of which are radar, imaging or positioning systems. Deliberations in the International Telecommunication Union Radio communication Sector (ITU-R) have resulted in a Report and Recommendation on UWB in November of 2005. National jurisdictions around the globe are expected to act on national regulations for UWB very soon. Due to the extremely low emission levels currently allowed by regulatory agencies, UWB systems tend to be short-range and indoors. UWB is also used in "see-through-the-wall" precision radar imaging technology, precision positioning and tracking (using distance measurements between radios), and precision time-of-arrival-based localization approaches.

In one embodiment of the present invention, at least one ground based radio communication device (12, 14, 16, and/or 18 of FIG. 1) can be implemented by using Bluetooth technology. Bluetooth is an industrial specification for wireless personal area networks (PANs). Bluetooth provides a way to connect and exchange information between devices such as mobile phones, laptops, PCs, printers, digital cameras, and video game consoles over a secure, globally unlicensed short-range radio frequency. The Bluetooth specifications are developed and licensed by the Bluetooth Special Interest Group.

In one embodiment of the present invention, at least one ground based radio communication device (12, 14, 16, and/or 18 of FIG. 1) can be implemented by using Wi-Fi transmitter. Wi-Fi is a brand originally licensed by the Wi-Fi Alliance to describe the underlying technology of wireless local area networks (WLAN) based on the IEEE 802.11 specifications. Standing for "wireless fidelity", it was developed to be used for mobile computing devices, such as laptops, in LANs, but is now increasingly used for more services, including Internet and VoIP phone access, gaming, and basic connectivity of consumer electronics such as televisions and DVD players, or digital cameras. More standards are in development that will allow Wi-Fi to be used by cars in highways in support of an Intelligent Transportation System to increase safety, gather statistics, and enable mobile commerce (see IEEE 802.11p). Wi-Fi and the Wi-Fi CERTIFIED logo are registered trademarks of the Wi-Fi Alliance—the trade organization that tests and certifies equipment compliance with the 802.11x standards.

In one embodiment of the present invention, at least one ground based radio communication device (12, 14, 16, and/or 18 of FIG. 1) can be implemented by using terrestrially based positioning technologies using mobile phone signals (E-OTD or TDOA). Multilateration, also known as hyperbolic positioning, is the process of locating an object by accurately computing the time difference of arrival (TDOA) of a signal emitted from the object to three or more receivers. It also refers to the case of locating a receiver by measuring the TDOA of a signal transmitted from three or more synchronized transmitters.

In one embodiment of the present invention, at least one ground based radio communication device (12, 14, 16, and/or 18 of FIG. 1) can be implemented by using Locata technology. The Locata positioning technology uses a network of terrestrial wireless transmitters to provide positioning in challenging environments for satellite based positioning systems (e.g. indoors) with systems in the 2.4 GHz ISM band.

Referring still to FIG. 1, in one embodiment of the present invention, the network of ground based radio communication devices further comprises at least four synchronized ground based radio transceivers 12, 14, 16, and 18. In this embodiment of the present invention, the network of at least four synchronized ground based radio transceivers provides 3-D solution for position coordinates of each mobile unit 22.

EXAMPLE II

It is sufficient to have four synchronized ground based radio transceivers to provide 3-D solution for position coordinates of each mobile unit because it takes three equations to obtain 3-D position coordinates of each mobile unit plus one equation for synchronization of timing coordinate.

In one embodiment of the present invention, the network of ground based radio communication devices of FIG. 1 (12, 14, 16, and 18) further comprises at least four synchronized ground based radio transceivers having a substantially weak vertical geometry. In this embodiment of the present invention, the network of at least four synchronized ground based radio transceivers provides 3-D solution for position coordinates of each mobile unit 22, wherein the 3-D solution has a substantially low vertical accuracy.

EXAMPLE III

Four synchronized ground based radio transceivers have a substantially weak vertical geometry will provide 3-D solution for position coordinates of each mobile unit also having a substantially weak vertical geometry because the vertical (Z) coordinate will be over determined.

Referring still to FIG. 1, in one embodiment of the present invention, the network of ground based radio communication devices further comprises at least three synchronized ground based radio transceivers 12, 14, and 16. In this embodiment of the present invention, the network of at least three synchronized ground based radio transceivers provides 2-D solution for horizontal position coordinates of each mobile unit 22.

EXAMPLE IV

It is sufficient to have three synchronized ground based radio transceivers to provide 2-D solution for position coordinates of each mobile unit because it takes two equations to obtain 2-D position coordinates of each mobile unit plus one equation for synchronization of timing coordinate.

Referring still to FIG. 1, in one embodiment of the present invention, the network of ground based radio communication devices further comprises at least three ground based radio transceivers 12, 14, and 16 with synchronization signals 60,1; 60,2; and 60,3 respectively emanating from a single external synchronization signal 60. In this embodiment of the present invention, the network of at least three ground based radio receivers provides 3-D solution for position coordinates of each mobile unit 22.

EXAMPLE V

It is sufficient to have three ground based radio transceivers to provide 3-D solution for position coordinates of each mobile unit because it takes three equations to obtain 3-D position coordinates of each mobile, wherein the synchronization of timing coordinate is provided by an external signal.

Referring still to FIG. 1, in one embodiment of the present invention, the network of ground based radio communication devices further comprises at least two ground based radio transceivers 12, and 14, with synchronization signals 60,1 and 60,2 respectively emanating from a single external synchronization signal 60. In this embodiment of the present invention, the network of at least two ground based radio receivers provides 2-D solution for position coordinates of each mobile unit 22.

EXAMPLE VI

It is sufficient to have two ground based radio transceivers to provide 2-D solution for position coordinates of each mobile unit because it takes two equations to obtain 2-D position coordinates of each mobile, wherein the synchronization of timing coordinate is provided by an external signal.

Referring still to FIG. 1, in one embodiment of the present invention, the network of ground based radio communication devices further comprises a single ground based radio transceiver 12 with synchronization signal 60,1 emanating from a single external synchronization signal 60. In this embodiment of the present invention, the single ground based radio receiver 12 provides a single distance coordinate from the single ground based radio transceiver 12 to each mobile unit 22.

EXAMPLE VII

It is sufficient to have a single ground based radio transceiver to provide a single distance coordinate from the single ground based radio transceiver to each mobile wherein the synchronization of timing coordinate is provided by an external signal.

Referring still to FIG. 1, in one embodiment of the present invention, the laser transmitter 16 further comprises a laser transmitter placed in a location 44 with known coordinates.

Figure 2:
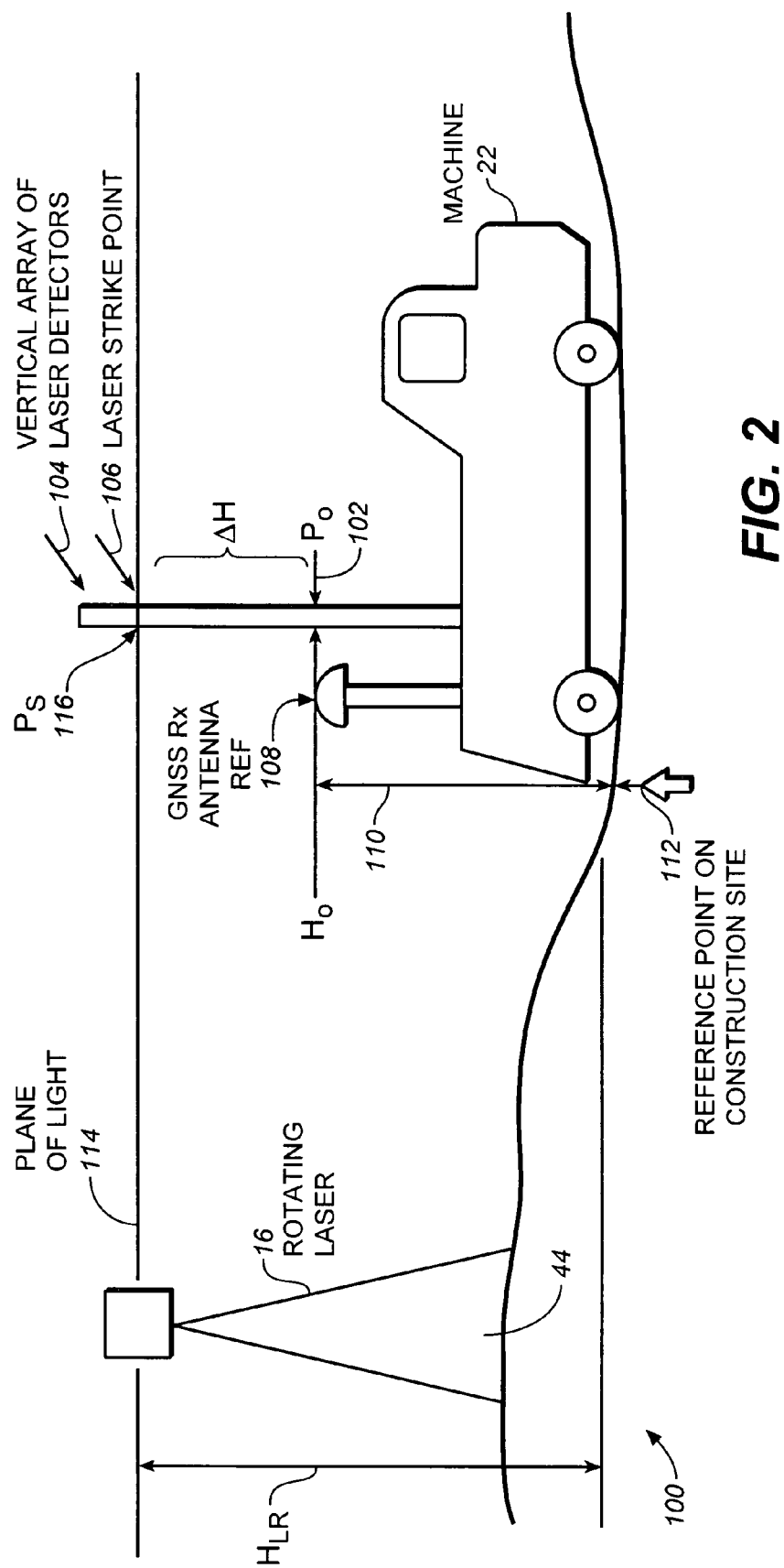
FIG. 2 illustrates 'benchmarking' method to determine the position of a laser transmitter by a setup procedure.

In one embodiment of the present invention, the laser transmitter 16 further comprises the laser transmitter 16 placed in a location 44 with unknown coordinates. In this embodiment of the present invention, as shown in FIG. 2, it is possible to use a process called 'benchmarking' to determine the position of the laser transmitter 16 by a setup procedure. The height Po 102 of a point on the laser detector array pole 104 is that of the GNSS antenna 108 of the user unit 22. The height Po 102 is measured on site, using a tape measure or a steel rod. It is also defined as the height of GNSS antenna Ho 110 above the reference ground point 112. Absolute height in any GPS coordinate system is not required in a benchmarking operation. The location of a laser strike 106 from the plane of laser light 114 on the laser detector array pole 104 is determined. The height of this position Ps 116 on the pole is then added to the known height Po 102, to determine the height H (LR) of the laser reference location above the first reference point 112 on the construction site. The height of the user unit 22 on the construction site at a different position can be determined by comparing the current laser strike position to Ps 116.

In one embodiment of the present invention, the laser transmitter further comprises a self-surveying laser transmitter (not shown) further comprising a stationary radio positioning system (RADPS) receiver integrated with the self-surveying laser transmitter. In this embodiment of the present invention, the stationary RADPS receiver includes a stationary radio antenna. In this embodiment of the present invention, the position coordinates of the laser transmitter are determined by using the stationary RADPS receiver that receives a plurality of radio signals from at least one radio source selected from the group consisting of: {GPS; GLONASS; combined GPS/GLONASS; GALILEO; Global Navigational Satellite System (GNSS); pseudolite transmitter; TV transmitter; UWB transmitter; Bluetooth transmitter; Wi-Fi transmitter; terrestrially based positioning technologies using mobile phone signals (E-OTD or TDOA); and Locata transmitter}.

In one embodiment of the present invention, referring still to FIG. 1, the laser transmitter 20 further comprises a plane laser transmitter configured to generate a reference laser beam (24, or 26) providing high accuracy vertical coordinate. Similar plane laser transmitter is fully disclosed in the U.S. Pat. No. 6,433,866 "High precision GPS/RTK and laser machine control" assigned to the assignee of the present invention. The U.S. Pat. No. 6,433,866 is incorporated herein in its entirety.

More specifically, according to the '866 patent, the laser transmitter 20 includes a rotating laser system. In a rotating laser system a laser source spins (mechanically, or optically) in the horizontal plane (or z-plane). The rotating laser emits a laser beam that provides an accurate reference plane with millimeter accuracy. However, to detect and get benefit of the rotating laser beam, the potential user has to be located within vertical range, and has to be equipped with a laser detector (or a laser receiver) capable of receiving the rotating laser beam. In the mechanical embodiment, the motor physically rotates the laser and accordingly the laser beam. In the optical embodiment, the mirror rotates in such a way that the physically non rotating laser emits the rotating laser beam.

Referring still to FIG. 1, in one embodiment of the present invention, the laser transmitter 20 generates a dual slope laser plane 24 (and/or 26). In this embodiment, the user unit receiver 26 includes a "vector" GPS receiver capable of determining the attitude of a dual slope laser plane 24 (and/or 26). A "vector" GPS receiver is disclosed in the U.S. Pat. No. 5,268,695 issued to Dentinger et al. This patent is incorporated herein in its entirety. The vector GPS receiver includes a system for time multiplexing a carrier signal received by two or more GPS antennas through a single hardware path, using a single receiver's oscillator in that hardware path as a reference to compare the phase from each antenna. One of the antennas is designated as a reference antenna and a carrier signal received by it is used to phase lock in a numerically controlled oscillator. The same carrier signal received by the other antennas is periodically compared in phase to the output of the numerically controlled oscillator. Each comparison results in a phase angle measurement for the respective antennas compared to the master antenna.

Referring still to FIG. 1, in one embodiment of the present invention, the laser transmitter 20 further comprises a fan laser transmitter configured to generate at least one rotating fan-shaped laser beam 24 (and/or 26) that rotates continuously about a vertical axis at a uniform rate above a known stationary point in the plot of land. Trimble Navigation Ltd. manufactures the 3D Laser Station that generates at least one rotating fan-shaped laser beam 13 (and/or 15). The detailed description of such fan laser transmitter is given in the copending patent application A-1500 "COMBINATION LASER SYSTEM AND GLOBAL NAVIGATION SATELLITE SYSTEM". The copending patent application A-1500 is assigned to the assignee of the present patent application.

Referring still to FIG. 1, in one embodiment of the present invention, the user unit positioning system 22 comprises: a radio receiver 26 further comprising a radio antenna 27 configured to receive a plurality of ranging radio signals including at least one ranging signal (30, 32, 34, and 36) transmitted by at least one ground based radio communication device (14, 16, 1, and 18 respectively). In this embodiment of the present invention, the user unit positioning system 22 further comprises a laser detector 28 configured to receive at least one laser beam (24, and/or 26) generated by the laser transmitter 20. The laser detector 28 comprising a number of diodes measures the signal strength on the number of diodes to determine the center of a laser beam. Topcon, Laser Systems, Inc., located in Pleasanton, Calif., manufactures machine mounted laser receivers: 9130 laser tracker and LS-B2 laser receiver. For reference, please see '866 patent. In this embodiment of the present invention, the user unit positioning system 22 further a processor 38 configured to convert a set of data including: {a set of data transmitted by at least one ranging radio signal; and a set of data transmitted by at least one laser beam} into position coordinates of the user unit 22, wherein a set of vertical coordinates of the user unit is obtained with a laser-assisted (LA) accuracy.

Referring still to FIG. 1, in one embodiment of the present invention, the user unit positioning system 22 comprises: a radio receiver 26 further comprising a radio antenna 27 configured to receive a plurality of ranging radio signals including at least one ranging signal (30, 32, 34, and 36) transmitted by at least one ground based radio communication device (14, 16, 1, and 18 respectively), and a satellite antenna 30 configured to receive at least one ranging satellite radio signal transmitted by at least one GNSS satellite (48, 50, 52, and/or 54). In this embodiment of the present invention, the user unit positioning system 22 further comprises a laser detector 28 configured to receive at least one laser beam (24, and/or 26) generated by the laser transmitter 20. In this embodiment of the present invention, the user unit positioning system 22 further comprises the processor 38 configured to convert a set of data including: {a set of data transmitted by at least one ranging radio signal; a set of data transmitted by at least one ranging satellite radio signal; and a set of data transmitted by at least one laser beam} into position coordinates of the user unit, wherein a set of vertical coordinates of the user unit is obtained with a laser-assisted (LA) accuracy.

In one embodiment, referring still to FIG. 1, the positioning system of the present invention 10 further comprises a wireless communication link 64 selected from the group consisting of: {a cellular link; a radio link; a private radio band link; a SiteNet® 900 private radio network; a wireless Internet link; a UWB link; a Bluetooth link; a Wi-Fi link; and a satellite wireless communication link}.

In general, the wireless communication link 64 (of FIG. 1) can be implemented by using a radio wave frequency band, an infrared frequency band, or a microwave frequency band. In one embodiment, the wireless communication link can include the ISM band, including 900 MHz, 2.4 GHz, or 5.8 GHz bands, wherein the user can own both ends of the ISM communication system.

In one embodiment of the present invention, the wireless communication link 64 (of FIG. 1) can be implemented by using the Trimble SiteNet® 900 private radio network. The Trimble SiteNet® 900 private radio network is a rugged, multi-network, 900 MHz radio modem designed specifically for the construction and mining industries. It is used to establish robust, wireless data broadcast networks for real-time, high-precision GPS applications. This versatile Trimble radio operates in the frequency range of 902-928 MHz, broadcasting, repeating, and receiving real-time data used by Trimble GPS receivers. Under optimal conditions, the SiteNet 900 radio broadcasts data up to 10 km (6.2 miles) line-of-sight and coverage can be enhanced by using a network of multi-repeaters. Using the SiteNet 900 radio as a repeater, enables one to provide coverage in previously inaccessible or obstructed locations. The SiteNet 900 radio is so versatile, that one can easily change its operating mode to suit any network configuration. This reduces costs and maximizes uptime. Additionally, SiteNet 900 is license free in the U.S.A. and Canada, which makes it extremely portable. One can move it from project to project without licensing hassles and restrictions. The SiteNet 900 radio is designed to operate reliably in demanding RF environments where many other products and technologies cannot. Optimized for GPS with increased sensitivity and jamming immunity, the SiteNet 900 radio also has error correction, and a high-speed data rate, ensuring maximum performance. The SiteNet 900 radio is especially suited for use with Trimble's SiteVision® GPS grade control system, and is ideal for all GPS machine control applications where reliability is important. The machine-rugged unit has been designed and built especially for harsh construction and mining environments. Fully sealed against dust, rain, splash, and spray, the SiteNet 900 radio remains reliable in all weather. The radio's ruggedness and reliability minimizes downtime, lowering ownership costs. Trimble's SiteNet 900 radio can be used with any Trimble GPS receiver, including: MS750, MS850, MS860, and 5700 receivers.

In one embodiment of the present invention, the wireless communication link 64 (of FIG. 1) can be implemented by using a 1.8 GHz band that supports the personal communications services (PCS). The PCS uses the international standard DCS-1800. Yet, in one more embodiment, the wireless communication link can include a real time circuit switched wireless communication link. For instance, the wireless communication link employing a real time circuit switched wireless communication link can include the Iridium satellite system produced by Motorola, Schaumburg, Ill.

In one additional embodiment, the wireless communication link 64 can be implemented by using a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20-30) GHz range are manufactured by Cellular Communications located in Redmond, Washington, and the LEOS systems in (1.6-2.5) GHz range are produced by Loral/Qualcomm located in San Diego, Calif.

The wireless communication link 64 can include a cellular telephone communication means, a paging signal receiving means, wireless messaging services, wireless application services, a wireless WAN/LAN station, or an Earth-Satellite-Earth communication module that uses at least one satellite to relay a radio wave signal. The wireless communication link can also include the cellular telephone communication means that can include an Advanced Mobile Phone System (AMPS) with a modem. The modem can comprise a DSP (digital signal processor) modem in 800 MHZ range, or a cellular digital packet data (CDPD) modem in 800 MHZ range. The cellular digital communication means includes a means of modulation of digital data over a radio link using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

For the purposes of the present invention, a cellular telephone communication means can be used to get a wireless access to the Internet in order, for example, to broadcast the real time coordinates of the self-surveying laser transmitter position on a special web-site.

In one embodiment of the present invention, referring still to FIG. 1, at least one user unit 22 further comprises a wireless communication device 62 configured to transmit the position coordinates of the user unit 22 via the wireless link 64. The wireless communication device 62 can be implemented by using any of devices that can be configured to provide: {a cellular link; a radio link; a private radio band link; a SiteNet 900 private radio network link; a link to the wireless Internet; and a satellite wireless communication link}. A person skillful in the art can easily identify all these devices.

In one embodiment of the present invention, referring still to FIG. 1, at least one user unit 22 further comprises a mobile unit further comprising an on-board computer 66 configured to utilize the set of positioning data obtained by the processor 38 with the laser assisted (LA) vertical accuracy.

In one embodiment of the present invention, referring still to FIG. 1, at least one mobile unit 22 further comprises an implement 68. In this embodiment of the present invention, the implement 68 can be controlled by utilizing a set of positioning data obtained by the processor 38 with the laser assisted (LA) vertical accuracy.

In one embodiment, the system of the present invention 10 (of FIG. 1) further comprises a Remotely Located Tracking Station (RLTS) 70 configured to utilize the set of positioning data of the mobile unit 22 obtained with the laser assisted (LA) vertical accuracy in order to track the mobile unit 22.

One more aspect of the present invention is directed a method of combined radio and laser positioning.

In one embodiment, the method of combined radio and laser positioning comprises (not shown): (A) providing a network of ground based radio communication devices 12, 14, 16, and 18 (of FIG. 1); (B) providing a laser transmitter 20 (of FIG. 1) configured to generate at least one laser beam 24, (and/or 26); and (C) using the network of ground based radio communication devices 12, 14, 16, and 18 (of FIG. 1) and using the laser transmitter 20 (of FIG. 1) to obtain position coordinates of at least one user unit 22 with a laser-assisted (LA) accuracy.

In one embodiment of the present invention, the step (A) further comprises (not shown): (A1) selecting at least one ground based radio communication device (12, 14, 16, and/or 18) from the group consisting of: {a pseudolite transmitter; a pseudolite transceiver; a TV transmitter; an UWB transmitter; a Bluetooth transmitter; a Wi-Fi transmitter; terrestrially based positioning technologies using mobile phone signals (E-OTD or TDOA); a Locata transmitter; and a Locata transceiver}.

In one embodiment of the present invention, the step (B) further comprises (not shown): (B1) selecting the laser transmitter 20 from the group consisting of: {a planar laser transmitter; a sloping planar laser transmitter; and a fan laser transmitter}.

In one embodiment of the present invention, wherein at least one user unit 22 further comprises the radio receiver 26, the laser detector 28, and the processor 38, the step (C) further comprises (not shown): (C1) using the radio receiver 26 to receive at least one ranging radio signal transmitted by at least one ground based radio communication device 12, 14, 16, and/or 18; (C2) using the laser detector 28 to receive at least one laser beam 24 (and/or 26) generated by the laser transmitter 20; and (C3) using the processor 38 to convert a set of data including {a set of data transmitted by at least one ranging radio signal; and a set of data transmitted by at least one laser beam} into position coordinates of the user unit 22, wherein a set of vertical coordinates of the user unit is obtained with a laser-assisted (LA) accuracy.

In one embodiment, wherein at least one user unit 22 further comprises the wireless communication device 62, the method of the present invention further comprises (not shown): (C4) using the wireless communication device 62 to transmit the position coordinates of the user unit 22 by using a wireless communication link 64.

In one embodiment, wherein at least one user unit 22 further comprises a mobile unit further comprising on-board computer 66, the method of the present invention further comprises (not shown): using the on-board computer 66 to control the user unit 22 by utilizing the set of positioning data obtained with the laser assisted (LA) vertical accuracy. In another embodiment, wherein at least one user unit 22 further comprises a mobile unit further comprising on-board computer 66, the method of the present invention further comprises (not shown): manually controlling the mobile unit 22 by using the set of positioning data of the mobile unit provided by the on-board computer 66, wherein the set of positioning data of the mobile unit is obtained by the processor 38 with the laser assisted (LA) vertical accuracy.

In one embodiment, wherein at least one user unit 22 further comprises an implement 68, the method of the present invention further comprises (not shown): using on-board computer 66 to control the implement 68 by utilizing a set of positioning data of the implement 68, wherein the set of positioning data of the implement 68 is obtained by the processor 38 with the laser assisted (LA) vertical accuracy. In another embodiment, wherein at least one user unit 22 further comprises the implement 68, the method of the present invention further comprises: manually controlling the implement 68 by using the set of positioning data of the implement provided by the on-board computer 66; wherein the set of positioning data of the implement is obtained by the processor 38 with the laser assisted (LA) vertical accuracy.

The foregoing description of specific embodiments of the present invention has been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A combined radio and laser positioning system comprising:
   a network of ground based radio position communication devices comprising at least two ground based radio communication devices;
   a laser transmitter configured to generate at least one laser beam;
   and
   at least one user unit; each said user unit comprising:
      a radio receiver configured to receive at least two ranging radio signals transmitted by said at least two ground based radio position communication devices;
      a laser detector configured to receive said at least one laser beam generated by said laser transmitter;
      and
      a processor configured to convert a set of data including:
         a set of data transmitted by said at least two ranging radio signals, and a set of data transmitted by said at least one laser beam into position coordinates of said user unit, wherein a set of vertical coordinates of said user unit is obtained with a laser-assisted (LA) accuracy.

2. The system of claim 1, wherein said at least one ground based radio position communication device further comprises:
   a ground based radio transceiver placed in a location with known coordinates.

3. The system of claim 1, wherein said at least one ground based radio position communication device further comprises:
   a stationary radio positioning system (RADPS) receiver integrated with a ground based radio transmitter, wherein position coordinates of said ground based radio transmitter are determined by using a plurality of radio signals transmitted by at least one radio source selected from the group consisting of: GPS; GLONASS; combined GPS/GLONASS; GALILEO; Global Navigational Satellite System (GNSS); pseudolite transmitter; pseudolite transceiver; TV transmitter; UWB transmitter; Bluetooth transmitter; Wi-Fi transmitter; terrestrially based positioning technologies using mobile phone signals (E-OTD or TDOA); Locata transmitter; and Locata transceiver.

4. The system of claim 1, wherein said network of ground based radio position communication devices further comprises:
at least four synchronized ground based radio transceivers; and wherein said network of at least four synchronized ground based radio transceivers provides 3-D solution for position coordinates of each said mobile unit.

5. The system of claim 1, wherein said network of ground based radio position communication devices further comprises:
at least four synchronized ground based radio transceivers having a substantially weak vertical geometry; and wherein said network of at least four synchronized ground based radio transceivers provides 3-D solution for position coordinates of each said mobile unit; and wherein said 3-D solution has a substantially low vertical accuracy.

6. The system of claim 1, wherein said network of ground based radio position communication devices further comprises:
at least three synchronized ground based radio transceivers; and wherein said network of at least three synchronized ground based radio transceivers provides 2-D solution for horizontal position coordinates of each said mobile unit.

7. The system of claim 1, wherein said network of ground based radio position communication devices further comprises:
at least three ground based radio transceivers with an external synchronization signal; and wherein said network of at least three ground based radio receivers provides 3-D solution for position coordinates of each said mobile unit.

8. The system of claim 1, wherein said network of ground based radio position communication devices further comprises:
at least two ground based radio transceivers with an external synchronization signal; and wherein said network of at least two ground based radio receivers provides 2-D solution for horizontal position coordinates of each said mobile unit.

9. The system of claim 1, wherein said laser transmitter further comprises:
a laser transmitter placed in a location with known coordinates.

10. The system of claim 1, wherein said laser transmitter further comprises:
a laser transmitter placed in a location with unknown coordinates.

11. The system of claim 1, wherein said laser transmitter further comprises:
a self-surveying laser transmitter further comprising:
a stationary radio positioning system (RADPS) receiver integrated with said self-surveying laser transmitter; said stationary RADPS receiver having a stationary radio antenna, and wherein position coordinates of said laser transmitter are determined by using said stationary RADPS receiver that receives a plurality of radio signals from at least one radio source selected from the group consisting of: GPS; GLONASS; combined GPS/GLONASS; GALILEO; Global Navigational Satellite System (GNSS); pseudolite transmitter; TV transmitter; UWB transmitter; Bluetooth transmitter; Wi-Fi transmitter; terrestrially based positioning technologies using mobile phone signals (E-OTD or TDOA); and Locata transmitter.

12. The system of claim 1, wherein said laser transmitter further comprises:
a planar laser configured to generate a reference laser beam providing a vertical coordinate having a substantially high accuracy.

13. The system of claim 1, wherein said laser transmitter further comprises:
a sloping planar laser configured to generate a reference sloping laser beam providing two angular coordinates having a substantially high accuracy.

14. The system of claim 1, wherein said laser transmitter further comprises:
a fan laser configured to generate at least one sloping fan laser beam.

15. The system of claim 1, wherein said laser transmitter further comprises:
a fan laser configured to generate at least two sloping fan laser beams.

16. The system of claim 1, wherein said at least one user unit further comprises:
a wireless communication device configured to transmit the position coordinates of said user unit.

17. The system of claim 16 further comprising:
a wireless communication link; wherein said wireless communication link is selected from the group consisting of: a cellular link; a radio link; a private radio band link; a Site Net 900 private radio network; a wireless Internet link; a UWB link; a Bluetooth link; a Wi-Fi link; and a satellite wireless communication link.

18. The system of claim 1, wherein said at least one user unit further comprises:
a mobile unit further comprising:
an on-board computer configured to utilize said set of positioning data of said mobile unit; wherein said set of positioning data of said mobile unit is obtained with said laser assisted (LA) vertical accuracy.

19. The system of claim 18, wherein said at least one mobile unit further comprises:
an implement, and wherein said implement of said mobile unit is controlled by utilizing a set of positioning data of said implement, and wherein said set of positioning data of said implement is obtained with said laser assisted (LA) vertical accuracy.

20. The system of claim 18 further comprising:
a Remotely Located Tracking Station (RLTS) configured to utilize said set of positioning data of said mobile unit obtained with said laser assisted (LA) vertical accuracy in order to track said mobile unit.

21. A combined radio and laser positioning system comprising:
a network of ground based radio position communication devices; each said ground based radio position communication device configured to transmit at least one ranging radio signal;
and
a laser transmitter configured to generate at least one laser beam;

wherein at least one user unit comprises: a radio receiver configured to receive at least two ranging radio signals transmitted by said at least two ground based radio communication devices; a laser detector configured to receive said at least one laser beam generated by said laser transmitter; and a processor configured to convert a set of data including: a set of data transmitted by said at least two ranging radio signals; and a set of data transmitted by said at least one laser beam into position coordinates of said user unit, wherein a set of vertical coordinates of said user unit is obtained with a laser-assisted (LA) accuracy.

22. A user unit positioning system comprising:
a radio receiver configured to receive at least two ranging radio signals transmitted by at least two ground based radio position communication devices; said at least two ground based radio position communication device transceivers being a part of a network of ground based radio position communication devices; each said ground based radio position communication device configured to transmit at least one ranging radio signal;
a laser detector configured to receive at least one laser beam generated by a laser transmitter;
and
a processor configured to convert a set of data including: a set of data transmitted by said at least two ranging radio signals; and a set of data transmitted by said at least one laser beam into position coordinates of said user unit, wherein a set of vertical coordinates of said user unit is obtained with a laser-assisted (LA) accuracy.

23. A user unit positioning system comprising:
a radio receiver further comprising:
    a radio antenna configured to receive a plurality of ranging radio signals including at least two ranging signals transmitted by at least two ground based radio position communication devices;
    and
    a satellite antenna configured to receive at least one ranging satellite radio signal transmitted by at least one GNSS satellite;
a laser detector configured to receive at least one laser beam generated by a laser transmitter;
and
a processor configured to convert a set of data including: a set of data transmitted by said at least two ranging radio signals; a set of data transmitted by said at least one ranging satellite radio signal; and a set of data transmitted by said at least one laser beam into position coordinates of said user unit, wherein a set of vertical coordinates of said user unit is obtained with a laser-assisted (LA) accuracy;
wherein each said ground based radio position communication device is selected from the group consisting of: a pseudolite transmitter; a pseudolite transceiver; a TV transmitter; an UWB transmitter; a Bluetooth transmitter; a Wi-Fi transmitter; terrestrially based positioning technologies using mobile phone signals (E-OTD or TDOA); a Locata transmitter; and a Locata transceiver;
and wherein each said GNSS satellite is selected from the group consisting of:
a GPS satellite; a GLONASS satellite; and a GALILEO satellite;
and wherein said laser transmitter is selected from the group consisting of:
a planar laser transmitter; a sloping planar laser transmitter; and a fan laser transmitter.

24. A method of combined radio and laser positioning comprising:
(A) providing a network of ground based radio position communication devices; said network comprising at least two ground based radio position communication devices;
(B) providing a laser transmitter configured to generate at least one laser beam;
and
(C) using said network of ground based radio position communication devices and using said laser transmitter to obtain position coordinates of at least one user unit with a laser-assisted (LA) accuracy.

25. The method of claim 24, wherein said step (A) further comprises:
(A1) selecting at least one said ground based radio position communication device from the group consisting of: UM a pseudolite transmitter; a pseudolite transceiver; a TV transmitter; an UWB transmitter; a Bluetooth transmitter; a Wi-Fi transmitter; terrestrially based positioning technologies using mobile phone signals (E-OTD or TDOA); a Locata transmitter; and a Locata transceiver.

26. The method of claim 24, wherein said step (B) further comprises:
(B1) selecting said laser transmitter from the group consisting of: a planar laser transmitter; a sloping planar laser transmitter; and a fan laser transmitter.

27. The method of claim 24, wherein said at least one user unit further comprises: a radio receiver, a laser detector, and a processor; and wherein said step (C) further comprises:
(C1) using said radio receiver to receive at least two ranging radio signals transmitted by said at least two ground based radio position communication devices;
(C2) using said laser detector to receive said at least one laser beam generated by said laser transmitter;
and
(C3) using said processor to convert a set of data including: a set of data transmitted by said at least two ranging radio signals; and a set of data transmitted by said at least one laser beam into position coordinates of said user unit, wherein a set of vertical coordinates of said user unit is obtained with a laser-assisted (LA) accuracy.

28. The method of claim 27, wherein said at least one user unit further comprises a wireless communication device; said method further comprising:
(C4) using said wireless communication device to transmit the position coordinates of said user unit by using a wireless communication link; wherein said wireless communication link is selected from the group consisting of: a cellular link; a radio link; a private radio band link; a Site Net 900 private radio network; a wireless Internet link; a UWB link; a Bluetooth link; a Wi-Fi link; and a satellite wireless communication link.

29. The method of claim 27, wherein said at least one user unit further comprises a mobile unit further comprising an on-board computer; said method further comprising:
(C5) using said on-board computer to control said user unit by utilizing said set of positioning data of said mobile unit; wherein said set of positioning data of said mobile unit is obtained with said laser assisted (LA) vertical accuracy.

30. The method of claim 29, wherein said at least one mobile unit further comprises an implement, said method further comprising:
(C6) using said on-board computer to control said implement by utilizing a set of positioning data of said implement, wherein said set of positioning data of said implement is obtained with said laser assisted (LA) vertical accuracy.

31. The method of claim 28, wherein said at least one user unit further comprises a mobile unit further comprising an on-board computer; said method further comprising:
- (C7) manually controlling said mobile unit by using said set of positioning data of said mobile unit provided by said on-board computer; wherein said set of positioning data of said mobile unit is obtained with said laser assisted (LA) vertical accuracy.

32. The method of claim 29, wherein said at least one mobile unit further comprises an implement, said method further comprising:
- (C8) manually controlling said implement by using said set of positioning data of said implement provided by said on-board computer; wherein said set of positioning data of said implement is obtained with said laser assisted (LA) vertical accuracy.

33. A method of combined radio and laser positioning comprising:
- (A) providing a network of ground based radio position communication devices comprising at least two ground based radio position communication devices; each said ground based radio position communication device configured to transmit at least one ranging radio signal to at least one user unit; and
- (B) providing a laser transmitter configured to generate and to transmit at least one laser beam to said at least one user unit;
- wherein a set of vertical coordinates of said user unit is obtained with a laser-assisted (LA) accuracy.

34. A method of user unit positioning comprising:
- (A) using a radio receiver to receive at least two ranging radio signals transmitted by at least two ground based radio position communication devices; said at least two ground based radio position communication device transceivers being a part of a network of ground based radio position communication devices; each said ground based radio position communication device configured to transmit at least one ranging radio signal;
- (B) using a laser detector to receive at least one laser beam generated by a laser transmitter;
- and (C) using a processor to convert a set of data including: a set of data transmitted by said at least two ranging radio signals; and a set of data transmitted by said at least one laser beam into position coordinates of said user unit, wherein a set of vertical coordinates of said user unit is obtained with a laser-assisted (LA) accuracy.

35. A method of user unit positioning comprising:
- (A) using a radio receiver to receive at least two ranging radio signals transmitted by at least two ground based radio position communication devices;
- (B) using said radio receiver to receive at least one ranging satellite radio signal transmitted by at least one GNSS satellite;
- (C) using a laser detector to receive at least one laser beam generated by a laser transmitter; and
- (D) using a processor to convert a set of data including: a set of data transmitted by said at least two ranging radio signals; a set of data transmitted by said at least one ranging satellite radio signal; and a set of data transmitted by said at least one laser beam into position coordinates of said user unit, wherein a set of vertical coordinates of said user unit is obtained with a laser-assisted (LA) accuracy;
- wherein each said ground based radio position communication device is selected from the group consisting of: a pseudolite transmitter; a pseudolite transceiver; a TV transmitter; an UWB transmitter; a Bluetooth transmitter; a Wi-Fi transmitter; terrestrially based positioning technologies using mobile phone signals (E-OTD or TDOA); a Locata transmitter; and a Locata transceiver;
- and wherein each said GNSS satellite is selected from the group consisting of:
- a GPS satellite; a GLONASS satellite; and a GALILEO satellite;
- and wherein said laser transmitter is selected from the group consisting of:
- a planar laser transmitter; a sloping planar laser transmitter; and a fan laser transmitter.

* * * * *